(12) United States Patent
Boehm

(10) Patent No.: US 8,100,032 B2
(45) Date of Patent: Jan. 24, 2012

(54) CABLE ADJUSTMENT DEVICE

(75) Inventor: Robert Boehm, Mainberg (DE)

(73) Assignee: SRAM Deutschland GmbH, Schweinfurt (DE)

( * ) Notice: Subject to any disclaimer, the term of this patent is extended or adjusted under 35 U.S.C. 154(b) by 416 days.

(21) Appl. No.: 11/562,844

(22) Filed: Nov. 22, 2006

(65) Prior Publication Data

US 2007/0137383 A1 Jun. 21, 2007

(30) Foreign Application Priority Data

Nov. 22, 2005 (DE) .......................... 10 2005 055 506

(51) Int. Cl.
*F16D 65/46* (2006.01)
*B62K 23/06* (2006.01)

(52) U.S. Cl. .................... 74/502.4; 74/489; 74/501.5 R; 74/501.6; 74/502.6

(58) Field of Classification Search .................... 74/489, 74/500.5, 501.6, 501.5 R, 502.2, 502.4, 502.6, 74/488; 188/24.11, 24.19, 24.22
See application file for complete search history.

(56) References Cited

U.S. PATENT DOCUMENTS

| | | | | |
|---|---|---|---|---|
| 3,759,352 A * | 9/1973 | Toplis | ...................... | 74/501.5 R |
| 3,808,908 A * | 5/1974 | Guerr | ............................ | 74/489 |
| 4,066,147 A * | 1/1978 | Toyomoto | .................... | 184/15.1 |
| 4,833,937 A * | 5/1989 | Nagano | ..................... | 74/501.5 R |
| 5,544,543 A | 8/1996 | Hilgert | | |
| 5,806,375 A * | 9/1998 | Oda | .......................... | 74/501.5 R |
| 5,809,840 A | 9/1998 | Oda | | |
| 5,862,711 A | 1/1999 | Oda | | |
| 5,921,143 A | 7/1999 | Castillo | | |
| 5,966,993 A | 10/1999 | Ekins | | |
| 6,328,138 B1 * | 12/2001 | Takizawa | .................... | 188/24.11 |
| 6,405,613 B1 * | 6/2002 | Lim | ............................ | 74/502.4 |
| 6,419,602 B1 | 7/2002 | Soon | | |
| 7,083,035 B2 * | 8/2006 | Noguchi et al. | ............. | 192/99 S |
| 2005/0029073 A1 * | 2/2005 | Noguchi et al. | ............. | 192/99 R |
| 2006/0117901 A1 * | 6/2006 | Owyang | ................. | 74/501.5 R |

FOREIGN PATENT DOCUMENTS

| | | |
|---|---|---|
| DE | 295 21 775 U1 | 9/1998 |
| DE | 102 34 813 A1 | 2/2004 |
| EP | 0 619 437 B1 | 10/1994 |
| EP | 0 727 349 | 8/1996 |
| EP | 0 774 590 | 5/1997 |
| EP | 0 843 789 B1 | 11/1997 |
| EP | 1 030 803 A1 | 3/2000 |
| EP | 11 06 493 A2 | 6/2001 |
| EP | 1 312 814 B1 | 5/2003 |
| GB | 374 661 | 6/1932 |
| WO | WO 2004/013501 | 2/2004 |

* cited by examiner

*Primary Examiner* — James Pilkington
*Assistant Examiner* — Thomas Diaz
(74) *Attorney, Agent, or Firm* — Milan Milosevic; Lisa Serdynski; Steven B. Courtright

(57) ABSTRACT

A cable adjustment device for a Bowden cable having a control cable displaceable within a cable casing for a bicycle component. The adjustment device includes a guide element axially and rotationally fixed to the bicycle component and has a control cable bore therethrough. An adjustment element is rotationally fixed and axially displaceable in the guide element. The adjustment element has an abutment for engaging the cable casing. The adjustment device also includes an actuation element. The adjustment element is threadably coupled relative to the actuation element for converting the rotational movement of the actuation element into the axial movement of the adjustment element.

6 Claims, 3 Drawing Sheets

CABLE ADJUSTMENT DEVICE

BACKGROUND OF THE INVENTION

The present invention relates to cable adjustment devices and more particularly to a cable adjustment device for bicycle brake and shifting systems.

Manually actuated bicycle brakes and shifting systems are actuated by operating brake or shift levers that are located on the handlebars and connected to front and rear brakes and derailleurs by Bowden cables. Typically, the Bowden cable includes a control cable displaceable within an outer casing. To adjust the control cable, an adjustment device is located at one or both ends of the outer casing.

EP 0 727 349 A2 discloses an adjustment device for a Bowden cable including a control cable and an outer casing, with the control cable protruding from the casing at both ends. The adjustment device includes a guide element, an adjustment element that is screwed into a threaded bore, a coil spring, and an actuation element. The guide element receives the control cable and includes an abutment for engaging the outer casing, while permitting the control cable to extend therethrough. The guide element is supported in the adjustment element, which may be screwed into a corresponding thread bore of a bicycle component by a screw thread to adjust the length of the control cable. The adjustment element is rotationally connected to the actuation element by a driving contour. A coil spring is disposed between the actuation element and the adjustment element for pressing the actuation element, which includes a detent contour, against a corresponding contour on the bicycle component to rotationally fix it.

A benefit of this adjustment device is that the position of the actuation element remains unchanged when the adjustment element is adjusted. However, when the actuation element is twisted, the exit point of the control cable from the guide element is displaced relative to the bicycle component, which is undesirable for control cables used in shifting systems. Further, the actuation element and the coil spring may be lost during installation of the adjustment device because they are loosely attached to the adjustment element.

SUMMARY OF THE INVENTION

An object of the present invention is to provide a pre-assembled cable adjustment device having a defined exit point for the control cable. Another object of the present invention is to use the existing preload of the control cable for pressing a detent contour of an actuation element against a corresponding detent contour on a bicycle component.

The present invention provides a cable adjustment device that is preassembled and includes a guide element fixed in place to a bicycle component for a brake or shifting system. The cable adjustment device adjusts the length of a Bowden cable. Typically, the Bowden cable includes a control cable that is displaceable in a cable casing. In one embodiment of the present invention, the adjustment device generally includes the guide element, an adjustment element, and an actuation element. The guide element includes a bore for receiving the control cable. The adjustment element includes an abutment for engaging the cable casing, while permitting the control cable to extend through a bore of the adjustment element. The adjustment element includes first and second sections. A diameter of the first section is larger than a diameter of the second section. The second section includes an outer thread for receiving a threaded insert. The threaded insert is fixed to the actuation element such that when the actuation element is rotated the adjustment element is axially displaced. To prevent rotation of the adjustment element, the outer thread includes noncircular or flattened sides which are received by a corresponding surface of the guide element. To prevent the rotation of the guide element in the bicycle component, the guide element includes a nonrotational outer surface. Additionally, the guide element is axially fixed in the bicycle component by a securing element. This configuration provides a stationary exit point for the control cable from the guide element that is independent of the position of the adjustment element. To provide unhindered movement of the control cable, the control cable bore in the guide element is widened on both sides.

The actuation element has a non-slip contour on its circumference and a detent contour on a side that cooperates with a corresponding detent contour on the bicycle component to provide a defined adjustment of the cable. The preload of the control cable creates a force that is exerted on the adjustment element and the threaded insert by the cable casing, causing the detent contour to press against the corresponding detent contour on the bicycle component, preventing an unintentional twisting of the actuation element. The threaded insert is fixed on the actuation element and converts the rotational motion of the actuation element into an axial displacement of the adjustment element.

The guide element includes a lip configured to interlock with a lip of the actuation element, preventing the guide element from being lost before being installed. Further, the lips of the guide element and the actuation element are spaced apart to permit detenting between the actuation element and the bicycle component. In one embodiment, the lip of the guide element is a collar and the lip of the actuation element is an interior shoulder having a smaller diameter than the collar.

To pre-assemble the adjustment device before installing it on the bicycle component, the guide element is first placed in the actuation element. Next, the threaded insert is pressed into the actuation element, and then adjustment element is screwed in the threaded insert. The adjustment device is installed by axially fixing the guide element on the bicycle component.

In another embodiment of the present invention, the threaded insert and the outer thread on the section of the adjustment element with the small diameter are omitted. Instead, the outer thread is located on a section of the adjustment element with the largest outer diameter and a corresponding inner thread is located on a section of the actuation element with the largest inner diameter. If the adjustment is screwed into the actuation element, then it is also not possible for the guide element to be lost in its uninstalled state.

The adjustment device of the present invention eliminates the need for a preloaded spring and, in its uninstalled state, the device forms a completely assembled unit with no loose parts, reducing the risk of lost parts. Further, due to the axial fixing of the guide element, the device remains completely assembled when it is installed on the bicycle component, even after the removal of the Bowden cable. The control cable exit point remains constant because of the stationary cable opening of the guide element. By rotationally fixing the adjustment element in the guide element, which is also rotationally fixed, there is no relative movement between the abutment in the adjustment element and the cable casing and control cable.

These and other features and advantages of the invention will be more fully understood from the following description of certain embodiments of the invention, taken together with the accompanying drawings.

DETAILED DESCRIPTION

Figure 1:
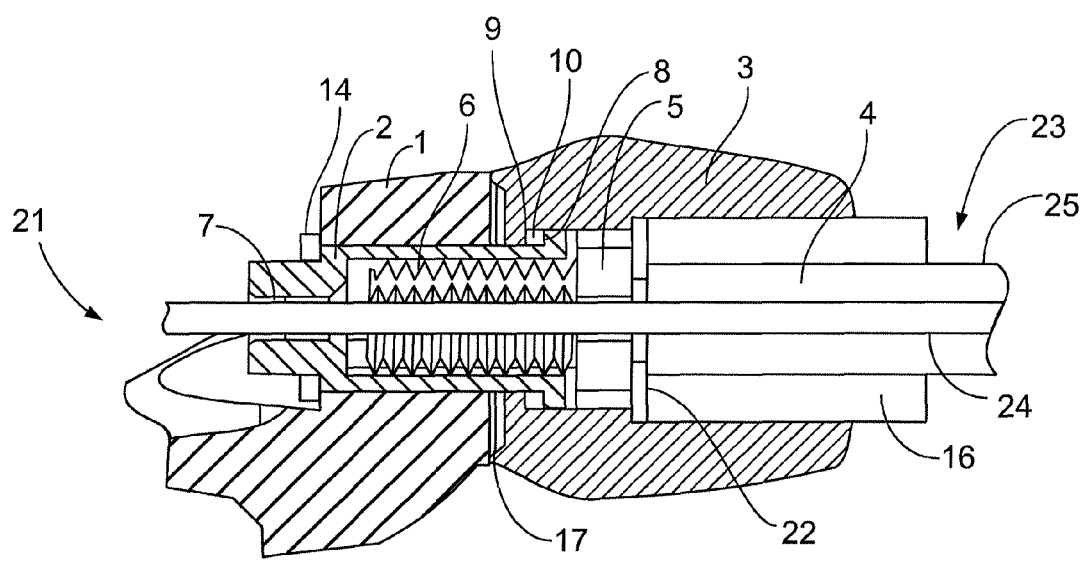
FIG. 1 is a cross-sectional view of a cable adjustment device in accordance with one embodiment of the present invention.
Figure 2:
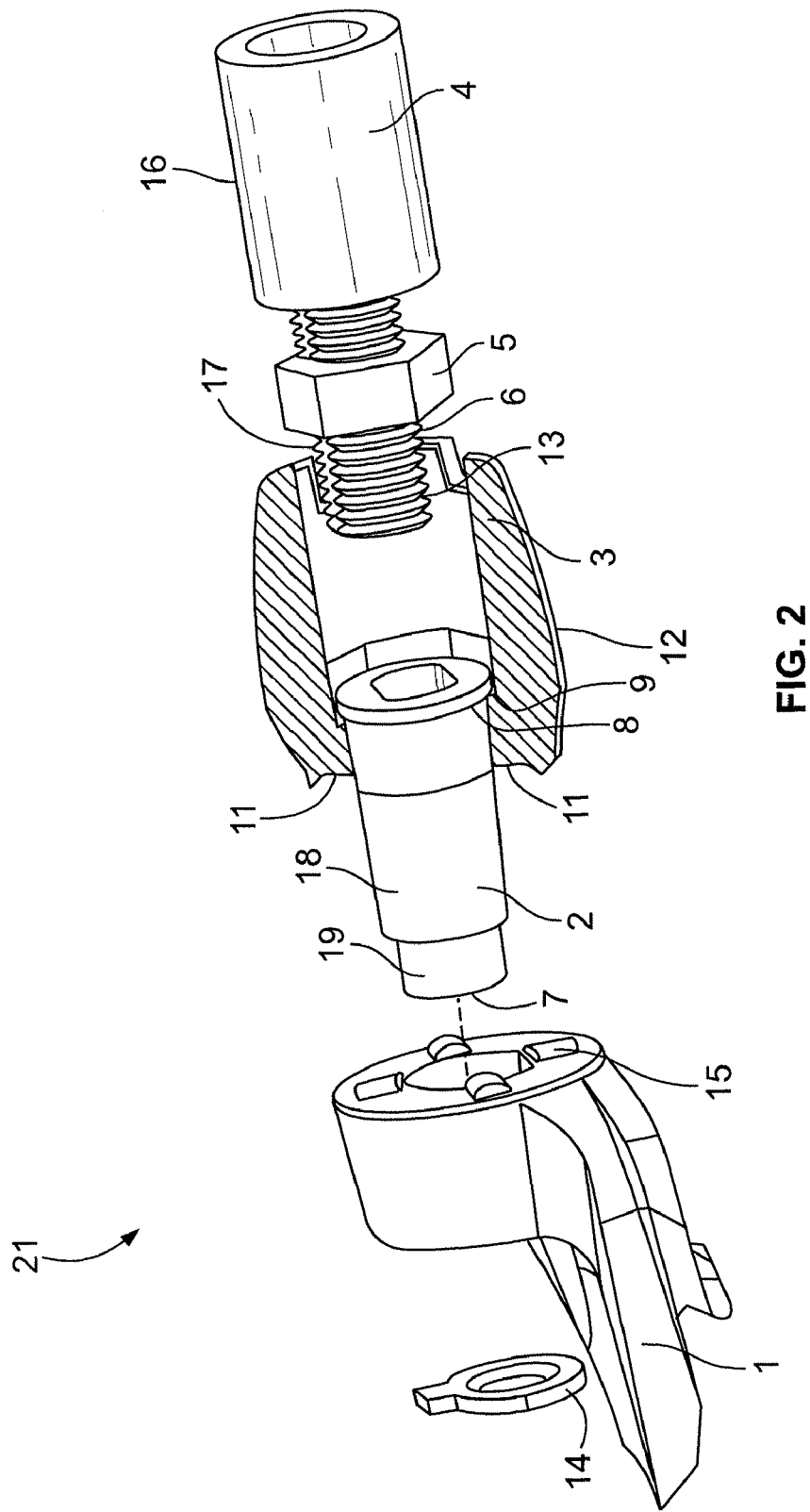
FIG. 2 is an exploded view of the cable adjustment device of FIG. 1.

FIGS. 1 and 2 illustrate a cable adjustment device 21 according to one embodiment of the present invention. The cable adjustment device 21 may be coupled to a bicycle component 1 that is fixed to a bicycle. For example, the cable adjustment device 21 may adjust the length of a Bowden cable 23 extending between front and rear brakes or derailleurs and shift lever or brakes levers located on the handlebar, respectively. The Bowden cable 23 includes a control cable 24 displaceable within a cable casing 25. The adjustment device 21 generally includes a guide element 2, an actuation element 3, and an adjustment element 4. The guide element 2 is rotationally and axially fixed to the bicycle component 1. The guide element 2 includes non-circular surfaces to rotationally fix it to the bicycle component 1. For example, the surface of the guide element 2 may have two flat sections and two curved sections. The guide element 2 is axially fixed by a securing element 14. The actuation element 3 is rotationally coupled to the component 1 and receives the adjustment element 4. The actuation element 3 includes a detent contour 11 engageable with a corresponding detent contour 15 on the bicycle component 1 to provide a defined adjustment of the control cable.

The adjustment 4 includes first and second sections 16, 17 having different outer and inner diameters. The first section 16 is partially enclosed by the actuation element 3 and, in its interior, an abutment 22 engages the cable casing 25, while permitting the control cable 24 to extend through the adjustment element 4. In this embodiment, the second section 17 includes an outer thread 6 that is screwed into a threaded insert 5 and has a through bore for receiving the control cable. The inner and outer diameters of the first section 16 are larger than the outer and inner diameters of the second section 17. To rotationally fix the second section 17 to the guide element 2, it has noncircular or flat sides.

The threaded insert 5, in this embodiment a nut, is pressed in the actuation element 3 such that when the actuation element 3 is rotated, the threaded insert 5 displaces the adjustment element 4 as well as the cable casing in an axial direction. In spite of a displacement of the adjustment element 4, the cable exit point remains constant due to the guide element 2 being rotationally fixed to the component 1 and axially fixed by a securing element 14. The guide element 2 includes a cable bore 7 that is widened on both sides for gentle cable guidance. To prevent the guide element 2 from being lost, when the adjustment device 21 is uninstalled, the guide element includes a lip 8, in this embodiment a collar. To prevent the actuation element 3 from being lost, when the adjustment device 21 is installed and the control cable 24 is removed, the actuation element 3 includes a lip 9, in this embodiment an interior shoulder. The outer diameter of the lip 8 of the guide element 2 is greater than the inner diameter of the lip 9 of the actuation element 3. A gap 10 exists between the lips 8, 9 to allow displacement of the actuation element 3 when the detent contour 11 on the actuation element 3 moves relative to the corresponding detent contour on the bicycle component 1.

Looking to FIG. 2, the guide element 2 is the central component of the adjustment device 21 and includes the lip 8, a middle section 18 and an end section 19 having a smaller outer diameter than the middle section 18 and the lip 8. The diameter of the lip 8 of the guide element 2 is greater than the inner diameter of the lip 9 of the actuation element 3 such that, on the one hand, the guide element 2 cannot be lost when the adjustment device 21 is uninstalled and the adjustment element 4 is screwed in and, on the other hand, the actuation element 3 with the adjustment element 4 screwed into it remains secured against loss on the guide element 2 and thus on the component fixed to the frame when the Bowden cable 23 is removed. The outer contour of the middle section 18 includes flat sections that engage a corresponding contour on the component 1 to prevent twisting of the guide element 2. The control cable bore 7 extends through the end section of guide element 2. The guide element 2 is axially fixed to the component 1 by the securing element 14 that engages the end section 19 of the guide element 2.

During the adjustment process, the actuation element 3, which is biased toward the component 1 by the control cable tension, is rotated, causing the detent contour 11 to glide over the corresponding detent contour 15. To improve the grip of the actuation element 3, the outer contour of the actuation element 3 includes grip plates 12 extending in the longitudinal direction. The threaded insert 5 cooperates with the outer thread 6 on the adjustment element 4 and converts the rotational motion of the actuation element 3 into an axial displacement of the adjustment element 4. To prevent the adjustment element 4 from rotating during adjustment process, at least one surface 13 is flattened on the outer thread 6 of the adjustment element 4. The flat surface 13 engages a corresponding contour in the interior of the guide element 2, preventing the guide element 2 from twisting in the component 1. This guarantees that the adjustment element 4 is only able to perform an axial motion during the adjustment process.

Figure 3:
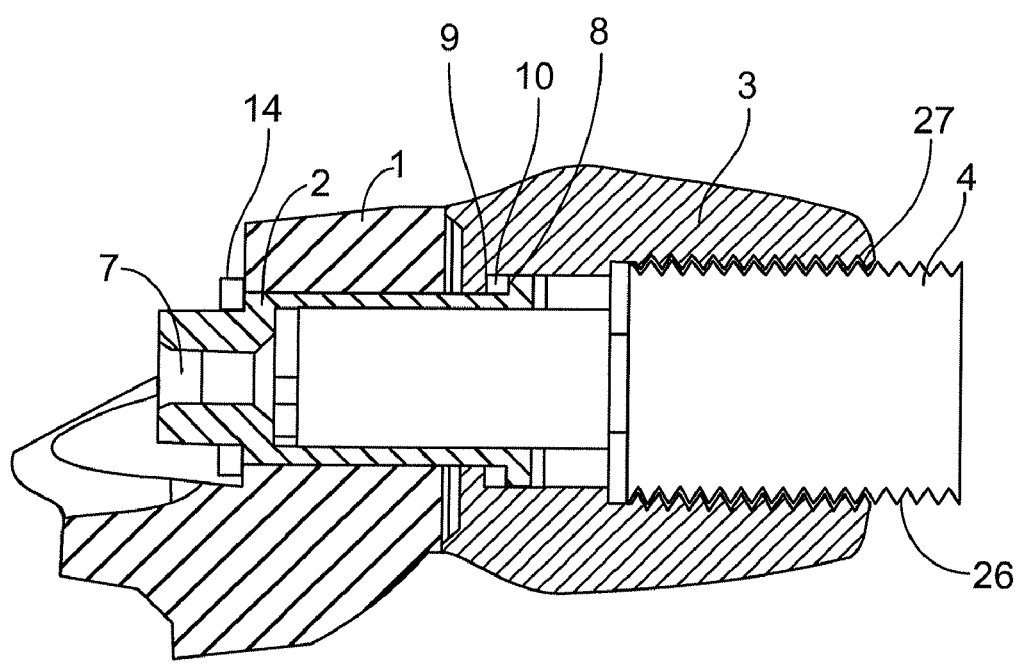
FIG. 3 is a cross-sectional view of a cable adjustment device in accordance with another embodiment of the present invention.

Looking to FIG. 3, in another embodiment of the present invention, the adjustment element 4 includes an outer thread 26 disposed on the section with the larger outer diameter and a corresponding inner thread 27 is located on the section of the actuation element 3 with the larger inner diameter. The adjustment element 4 is secured against twisting by an adapted cross-sectional shape of the section of the adjustment element with the small radial outer dimension and the section on the guide element 2 with the large radial inner dimension. In so doing, the pressing of the threaded insert 5 into the actuation element 3 is omitted. In its uninstalled state, the adjustment element 4 is screwed into the actuation element 3 and thus prevents the guidance element 2 from falling out.

While this invention has been described by reference to certain embodiments, it will be understood that numerous changes could be made within the spirit and scope of the inventive concepts described. Accordingly, it is intended that the invention not be limited to the disclosed embodiments, but that it include the full scope permitted by the language of the following claims.

What is claimed:

1. A cable adjustment device for a Bowden cable having a control cable displaceable within a cable casing for a bicycle component, the adjustment device comprising:

a guide element axially and rotationally fixed to the bicycle component and having a control cable bore therethrough;

an adjustment element rotationally fixed and axially displaced in the guide element, the adjustment element having an abutment for engaging the cable casing;

an actuation element rotated relative to and axially abutting the bicycle component; and a detent contour on the actuation element axially abutting a corresponding detent contour on the bicycle component, the adjustment element having threads for threadably coupling the adjustment element relative to the actuation element for converting the rotational movement of the actuation element into the axial displacement of the adjustment element, further comprising a threaded insert fixed on the actuating element and threadably coupled to the adjustment element, and wherein a section of the adjustment element with the smallest outer diameter includes an outer thread for threadably coupling to the threaded insert.

2. A cable adjustment device for a Bowden cable having a control cable displaceable within a cable casing for a bicycle component, the adjustment device comprising:

a guide element axially and rotationally fixed to the bicycle component and having a control cable bore therethrough;

an adjustment element rotationally fixed and axially displaced in the guide element, the adjustment element having an abutment for engaging the cable casing;

an actuation element rotated relative to and axially abutting the bicycle component; and a detent contour on the actuation element axially abutting a corresponding detent contour on the bicycle component, the adjustment element having threads for threadably coupling the adjustment element relative to the actuation element for converting the rotational movement of the actuation element into the axial displacement of the adjustment element, and wherein the guide element includes a lip configured to interlock with a lip of the actuation element.

3. The cable adjustment device in accordance with claim 2 wherein the lips of the guide element and the actuation element are spaced apart to permit detenting between the actuation element and the bicycle component.

4. The cable adjustment device in accordance with claim 2 wherein the lip of the guide element has an outer diameter greater than an inner diameter of the lip of the actuation element.

5. The cable adjustment device in accordance with claim 2 wherein the actuation element is biased to axially abut the bicycle component by a tension in the Bowden cable.

6. The cable adjustment device in accordance with claim 1 wherein the actuation element is biased to axially abut the bicycle component by a tension in the Bowden cable.

* * * * *